Nov. 21, 1961  G. H. HUFFERD ET AL  3,009,975
SPARK SOURCE FOR AN INTERNAL COMBUSTION ENGINE
Filed Nov. 28, 1958  4 Sheets-Sheet 1
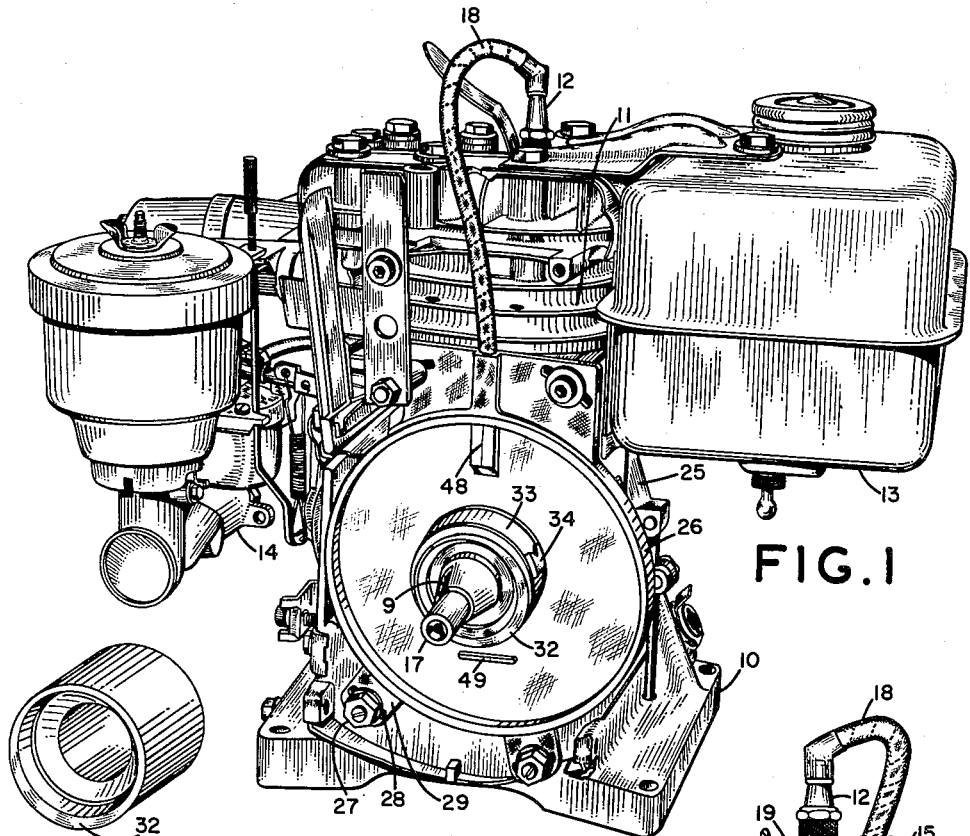
INVENTORS
GEORGE H. HUFFERD
HERMAN LANSING VAIL JR.
BY ROBERT H. JOSEPHSON
*Eber J. Hyde*
ATTORNEY Nov. 21, 1961  G. H. HUFFERD ET AL  3,009,975
SPARK SOURCE FOR AN INTERNAL COMBUSTION ENGINE
Filed Nov. 28, 1958  4 Sheets-Sheet 2

INVENTORS
GEORGE H. HUFFERD
HERMAN LANSING VAIL JR.
BY ROBERT H. JOSEPHSON

Eber J. Hyde
ATTORNEY

Nov. 21, 1961 G. H. HUFFERD ET AL 3,009,975
SPARK SOURCE FOR AN INTERNAL COMBUSTION ENGINE
Filed Nov. 28, 1958 4 Sheets-Sheet 3

INVENTORS
GEORGE H. HUFFERD
HERMAN LANSING VAIL JR.
ROBERT H. JOSEPHSON
BY
*Eber J. Hyde*
ATTORNEY Nov. 21, 1961   G. H. HUFFERD ET AL   3,009,975
SPARK SOURCE FOR AN INTERNAL COMBUSTION ENGINE
Filed Nov. 28, 1958   4 Sheets-Sheet 4
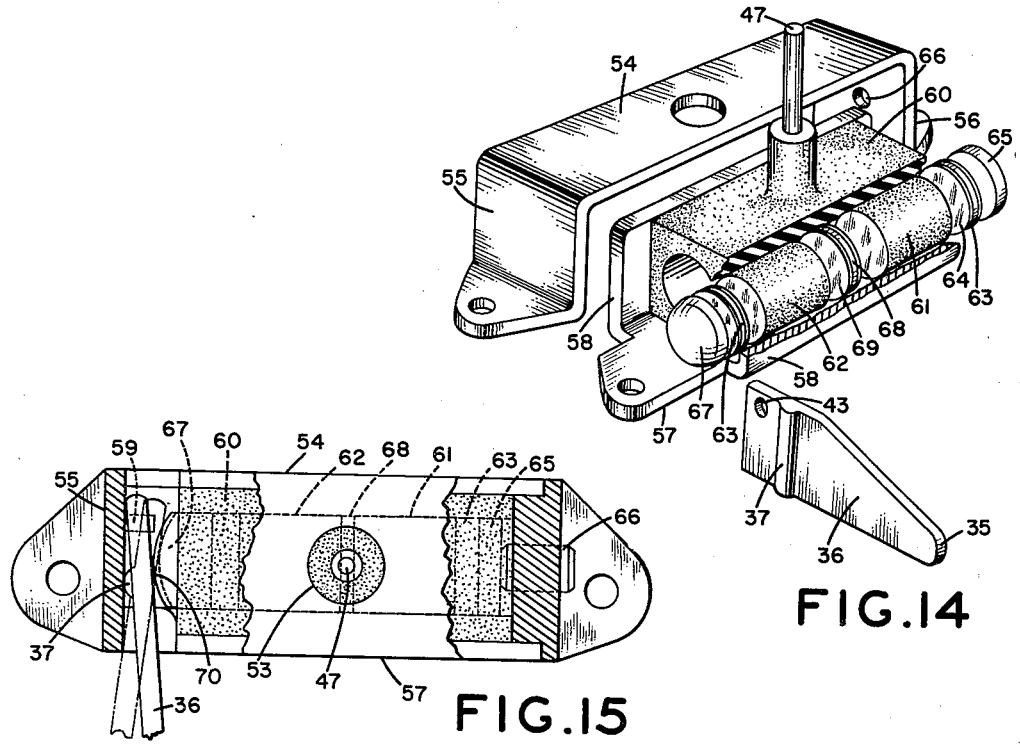
FIG.14
FIG.15
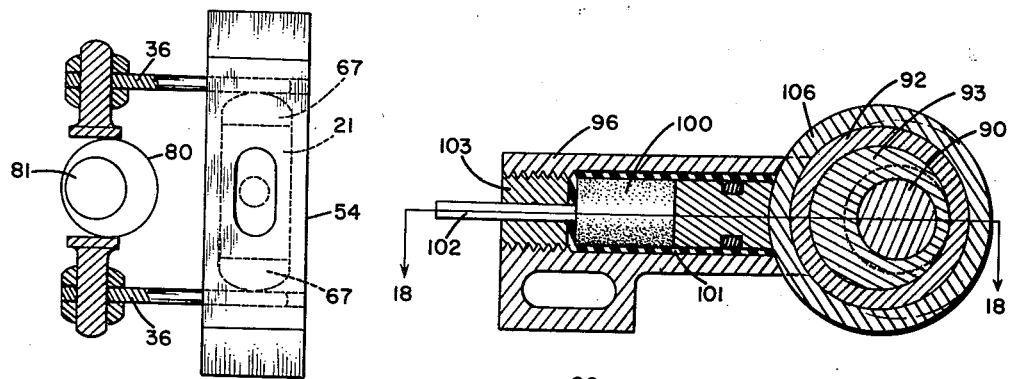
FIG.16
FIG.17
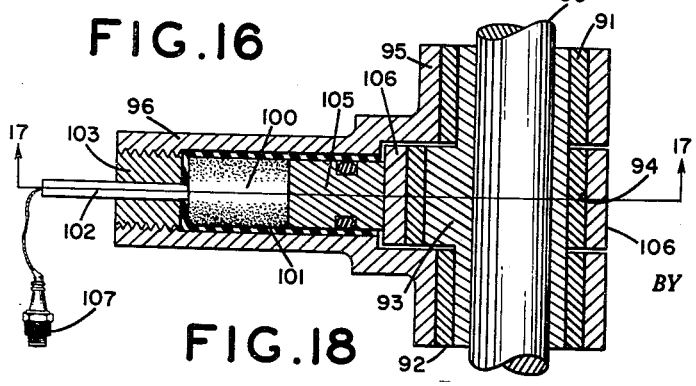
FIG.18
*INVENTORS*
GEORGE H. HUFFERD
HERMAN LANSING VAIL JR.
ROBERT H. JOSEPHSON
BY
Eber J. Hyde
ATTORNEY

3,009,975
SPARK SOURCE FOR AN INTERNAL COMBUSTION ENGINE
George H. Hufferd, Lyndhurst, Herman Lansing Vail, Jr., Shaker Heights, and Robert H. Josephson, Cleveland Heights, Ohio, assignors to Clevite Corporation, Cleveland, Ohio, a corporation of Ohio
Filed Nov. 28, 1958, Ser. No. 776,793
24 Claims. (Cl. 123—148)

This invention pertains to an internal combustion engine, and more particularly, to an internal combustion engine of the reciprocating type, having an improved voltage source for ignition purposes.

Internal combustion engines equipped with spark plugs to ignite the compressed fuel vapor in the cylinder conventionally use one or the other of two basic voltage sources. Automobiles use batteries since the battery is also useful for self-starting, radio and other accessories, and lawn mower engines, stationary engines, airplane engines and the like usually use a permanent magnet (magneto) generator.

The problems in both of these basic systems are in many instances alike, and, of course, due to their fundamental differences, the two systems also have different problems. One of the most serious problems in both of these prior systems was that of preventing excessive electrical leakage between the electrodes of the spark plug, which if it occurred, would result in inadequate ignition. In these systems the high tension voltage which fires the spark plug or plugs results from the collapse of flux in the core of an ignition coil. Although this takes place very rapidly, it still requires a finite period of time due to the fact that energy in one form is being transformed into energy in another form. Since the high tension voltage in these past systems appears across the electrodes of the spark plug or plugs during the time interval required to build up this voltage, any leakage path shunting the electrodes of the spark plug detracts from the voltage available to fire the plug.

In an effort to overcome this problem, condenser discharge and high frequency ignition systems were developed. An example of these past expedients is the high frequency ignition system of the Wargin et al. Patent No. 2,456,475. Although these prior condenser discharge and high frequency ignition systems did accomplish their purpose, their inherent cost and complexity kept them from coming into general use and they were, therefore, of no value to the small utility engine field.

Another means of minimizing the objectionable effects of spark plug leakage is the piezoelectrical ignition system of the Harkness Patents Nos. 2,649,488, 2,717,589, and 2,717,916. The piezoelectric system of these patents does not have the objection of high cost and complexity characteristic of the condenser discharge and high frequency ignition systems, but it was found to be entirely too noisy for general acceptance.

The present invention, like the Harkness ignition system of the Harkness Patents 2,649,488, 2,717,589, and 2,717,916, employs a piezoelectric element as its voltage source and hence has the advantages which flow from the use of a piezoelectric element for this purpose, but due to a new and improved manner of stressing the element and applying the generated voltage to the spark plug, which this invention provides, the main objection to the prior piezoelectric ignition system, namely, noise, is eliminated. In addition, the present invention overcomes the spark delay at high engine speeds inherent in the prior Harkness piezoelectric system and which was occasioned by the time involved in converting the energy stored in a spring into kinetic energy of the hammer which that system used to stress the piezoelectric element.

The impacting action used in the Harkness piezoelectric system to stress the element is inherently very noisy, and no amount of deadening can reduce this noise to an acceptable level. The present invention overcomes this objection by substituting a periodic squeezing action for the hammer blow of the Harkness system and then applying the generated voltage to the spark plug either directly or, preferably through a distributor operating in timed relation with the engine crankshaft. If applied directly the plug fires when the voltage reaches a critical value. If a distributor is utilized, a voltage is built up as the element is squeezed, and is retained or stored by the element until the instant the spark plug is to be fired. At that instant the distributor connects the element across the electrodes of the plug and the plug fires instantaneously.

In the system utilizing a distributor the piezoelectric element is electrically disconnected from the plug until the exact instant it is to fire. Accordingly, no spark plug leakage can occur, and instead all of the voltage generated by the element is always applied to the plug, provided, of course, that the "hot" side of the piezoelectric element and the means for connecting it to the spark plug terminal are properly and adequately insulated.

Inasmuch as the full potential generated by the piezoelectric element as it is squeezed can be reached appreciably before the instant the plug should fire, it follows that the instant of firing may be varied, within limits, in order to achieve the optimum timing of the spark. In other words, with this invention the spark may be advanced or retarded to meet different engine conditions, and in addition, this spark timing may be very easily and simply accomplished while the engine is running.

Another outstanding advantage obtained by squeeezing the piezoelectric element rather than hammering it is that it produces a much higher voltage. When a piezoelectric element is hammered, the stress in the element is produced by the propagation of a pressure wave. Hence, the element is not instantaneously uniformly stressed, and accordingly, the voltage generated is less than the maximum of which the element is capable. Also, the voltage generated by a hammer blow upon a piezoelectric element results from purely the piezoelectric phenomenon, whereas squeezing the element produces, in addition to the piezoelectric action, a reversible ferroelectric domain-switching process which adds greatly to the voltage built up in the element. Tests have shown that by the squeezing action a 50 to 100% increase in voltage generated is to be expected over that obtainable by applying a hammer blow to the piezoelectric element, and since the ferroelectric domain-switching process is reversible, the same energy increase is obtained when the squeezing force is released, it being understood that the change in the stress upon the element during release of the squeezing pressure generates a voltage in the element in the same way that the squeezing action does if the squeeze potential has previously been discharged.

This dual voltage generation obtained from the periodic application and release of squeezing pressure upon the element gives the present invention another important advantage over the prior Harkness piezoelectric ignition system. Thus, where with the prior system it was possible to produce but one spark with each hammer blow, the successive squeezing and releasing of the element in accordance with this invention makes possible two separate sparks, well separated from one another timewise.

From the foregoing discussion it will be clear that the objects of this invention, stated briefly, are:

(1) To provide a piezoelectric ignition system for an internal combustion engine which is not noisy;

(2) To provide a piezoelectric ignition system for an internal combustion engine wherein the timing of the spark may be advanced or retarded at will and while the engine is running;

(3) To provide a piezoelectric voltage source for the ignition system of an internal combustion engine wherein a single piezoelectric voltage source may be used to fire a plurality of spark plugs;

(4) To provide a piezoelectric voltage source for an internal combustion engine wherein the mechanical stressing of the element to produce the voltage is effected in such a way that the generated voltage is much higher than that obtained by prior piezoelectric voltage sources for ignition purposes;

(5) To provide a piezoelectric voltage source for internal combustion engines wherein the generated voltage is stored in the piezoelectric element itself and not applied to the spark plug until the instant of firing determined by a distributor operating in timed relation to the engine crankshaft, so that spark plug leakage is avoided and reliable ignition is assured.

For a better understanding of the present invention, together with other and further objects thereof, reference is had to the following description taken in connection with the accompanying drawings, and its scope will be pointed out in the appended claims.

With reference to the drawings:

FIGURE 1 shows a typical internal combustion engine equipped with the ignition system of this invention, the flywheel being removed and the drive shaft being modified in accordance with the present invention.

FIGURE 2 is a cross sectional view through the engine showing the internal mechanism of a portion of the engine.

FIGURE 3 is a plan view of the inside face of the flywheel illustrating the location of the piezoelectric unit.

FIGURE 5 is an isometric view of an eccentric bushing which mounts on a stationary portion of the engine.

Figure 8:
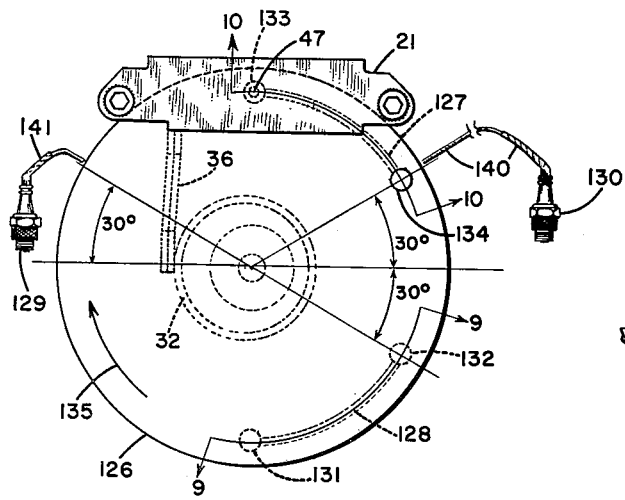
FIGURE 8 is a diagrammatic plan view of a distributor unit for a two cylinder engine.
Figure 9:
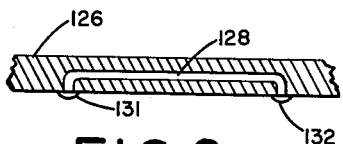
Figure 10:
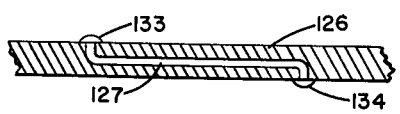

FIGURES 9 and 10 are sectional views taken along lines 9—9 and 10—10 of FIGURE 8.

Figure 11:
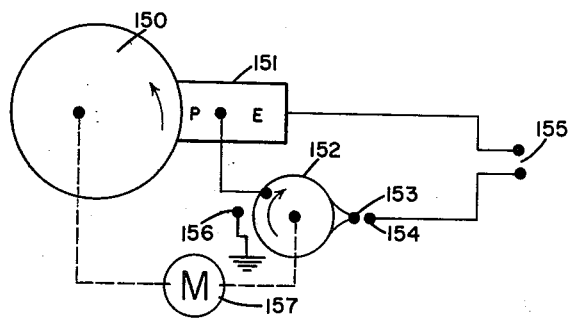

FIGURE 11 is a schematic circuit diagram of a one-cylinder device embodying the present invention.

Figure 12:
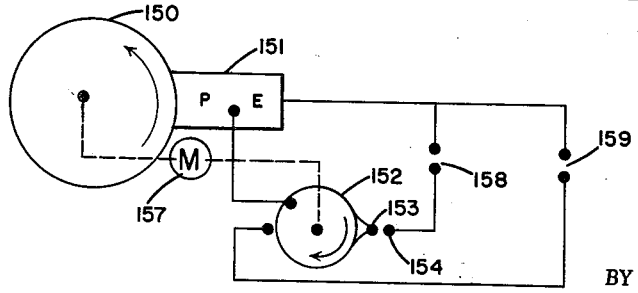

FIGURE 12 is a schematic circuit diagram of a two-cylinder device embodying the invention.

Figure 13:
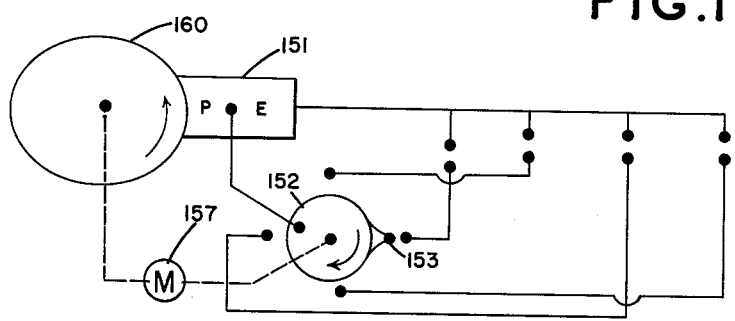

FIGURE 13 is a schematic circuit diagram of a four-cylinder device embodying the invention.

FIGURE 14 is an isometric exploded view of the piezoelectric unit.

FIGURE 15 is a sectional view, partially broken away, showing the assembled piezoelectric unit.

FIGURE 16 is a schematic drawing illustrating how the principles of the invention can be applied to an eight-cylinder engine.

FIGURE 17 is a cross-sectional view taken along line 17—17 of FIGURE 18, and

FIGURE 18 is a cross-sectional view taken along line 18—18 of FIGURE 17 showing an ignition system wherein a separate timer or distributor device is not utilized.

An aspect of the invention lies in the provision of an internal combustion engine having spark plug means and a polycrystalline piezoelectric element therefor. Means are driven from the engine in timed relation with the reciprocation of the engine's piston means periodically to squeeze and release the piezoelectric element to cause said element periodically to generate and maintain electric potentials, and distributor means are operated in timed relation with the engine periodically to momentarily connect the piezoelectric element and the spark plug means in series circuit only during the maintenance of the potential thereby to discharge the electric potential as a spark across the electrodes of the spark plug means.

Another aspect of the invention lies in the provision of an ignition system for an internal combustion engine of the reciprocating type having a crankshaft and a spark plug, the means for firing the spark plug comprising a polycrystalline piezoelectric element and mechanical pressure applying means which operate in timed relation with the engine crankshaft and which is connected with the piezoelectric element to periodically apply a controlled squeeze to the element and then release the element of the compression caused by the squeezing action, to thereby generate an electrical potential in the element. And circuit means connect the piezoelectric element and the electrodes of the spark plug in series circuit so that a voltage generated in the element discharges through the spark plug to fire the same.

With reference to the drawings FIGURE 1 shows an internal combustion engine of the general type used for lawn mowers and snow plows, but it is to be understood that the engine illustrated is merely an example since the invention herein disclosed is applicable to all types of internal combustion engines, including multi-cylinder engines for automotive use.

As is well known in the art, engines generally have a base 10 including an integral cylinder block 11 into which a spark plug 12 extends. A gasoline tank 13 is mounted on the engine, and through suitable carburetor means 14 (not described in detail) fuel is supplied to the cylinder or cylinders in timed relation to motion of the piston 15, the valves 16, the crankshaft 17, the camshaft 8, etc. (shown in FIGURE 2).

An ignition system, which is the subject of the present invention, periodically supplies a high voltage electrical spark to each of the one or more cylinders by means of one or more lead wires 18. The spark is produced by an electrical potential being quickly discharged to ground across the spaced electrodes 19 of the spark plug 12, as is well known in the art.

A flywheel 20 is mounted on the end of the crankshaft 17, or on the end of a shaft driven by the crankshaft, so that it rotates with the shaft.

In accordance with one phase of the present invention shown in FIGURE 3, a piezoelectric unit 21 is the source of the spark potential and is mounted on the inside face of the flywheel 20 and rotates with it. The details of the piezoelectric unit will later be described in detail in connection with FIGURES 6 and 14. The piezoelectric unit 21 contains a piezoelectric crystal element 46 which is squeezed to cause it to generate and hold a high voltage electrical potential until the potential is discharged, and thereafter, upon the squeezing action being released, the piezoelectric crystal element 46 generates another spark potential.

In the device shown in FIGURES 1 to 6 the crystal element 46 of the piezoelectric unit 21 is squeezed once and is released once during each revolution of the flywheel. The details of the squeezing and releasing mechanism are described in detail in connection with FIGURES 14, 15.

The crankcase housing wall 25 has an insulating plate 26 made of "Bakelite" or the like connected to it for limited rotary adjustment about the crankshaft axis by means of bolts 27 which extend through arcuate slots 28 in ears 29 which are integral with plate 26. Thus the insulating plate 26 may be rotated slightly in a forward or reverse direction to alter the timing of the motor, as will later become apparent. This timing adjustment may be manual or automatic, as is known to the art. A bushing 30 mounted in the crankcase wall 25 has the crankshaft 17 journaled therein, and an outwardly projecting annular boss 31 encircling the shaft 17 in radially spaced relation thereto, has an eccentric collar or bushing 32 press-fitted thereon. The collar or bushing is made of bearing material and rotatably mounts a sleeve 33 for rotation with the flywheel 20.

Sleeve 33 has welded to its outside face a V-shaped lever retainer 34 in which one end 35 of a lever arm 36 rests. The other end of the lever 36 extends into and forms a part of the piezo-electric unit 21 to alternately squeeze and release its element 46, in a manner to be explained, as the sub-assembly comprising the flywheel 20, the piezoelectric unit 21, the lever arm 36 and the sleeve 33, rotate around the stationary eccentric bushing 32. The rotating flywheel 20, through the piezoelectric unit 21 and the lever arm 36, drives the sleeve 33 around the stationary eccentric collar 32, in the direction shown by the arrow in FIGURE 3. To impart such rotation to this subassembly the flywheel 20 is secured to the crankshaft 17 by means of a key 9 and a nut 38 threaded onto the outer end portion 17 of the shaft. The flywheel 20 with its piezoelectric unit must have a fixed positional relationship to the position of the shaft 17, key 9 being provided to maintain that relationship.

Within the annular projecting portion 31 of the crankcase wall 25 is an oil seal 39, and an oil return hole 40 extends from the sealed space 41 into the crankcase. The eccentric bushing 32 preferably is slightly porous and receives its lubrication through bushing 30, through the oil hole 40 and through an oil hole 42 which extends from the sealed space 41 to the internal surface of the bushing 32. There can be no pressure build-up within space 41 due to oil hole 40.

Figure 4:
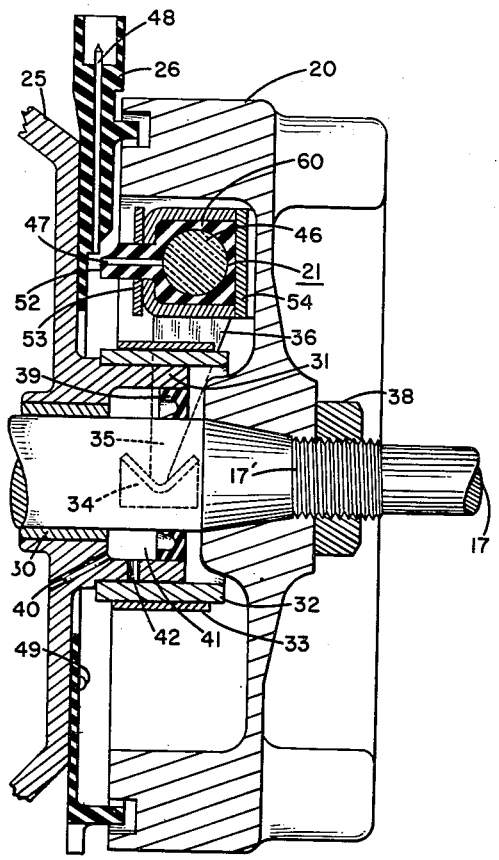
FIGURE 4 is a longitudinal sectional view through the flywheel taken along line 4—4 of FIGURE 3, showing the piezoelectric unit and its relation to a spark distributor at the instant of firing.

As the flywheel 20 and the piezoelectric unit 21 mounted thereon rotate, the stationary eccentric bushing 32 actuates the lever arm 36 causing, by compression of the crystal element 46 therein, a high voltage spark potential to be generated. FIGURE 15 which is later described shows how actuation of the lever 36 causes compression of the crystal element 46. This potential is held across the piezoelectric crystal element, which serves as a capacitor, until the proper time for firing the spark plug. This instant is determined by the juxtapositioning of the hot lead 47 of the crystal element and a stationary conductive pin 48 which is mounted in the "Bakelite" plate 26, as is shown in FIGURE 4. Prior to this juxtapositioning there is no conductive path adjacent the hot lead 47 and consequently the charge is held across the crystal element 46 so long as the crystal element is maintained in a compressed state, but when the hot lead 47, due to the rotation of the flywheel 20, comes close to the conductive pin 48 a high voltage spark jumps from the lead 47 to the pin 48, and as shown in FIGURE 1, pin 48 is directly connected to the spark plug 12. Thus plug 12 is fired by having the entire charge from the crystal element 46 substantially instantly applied across its electrodes.

Timing of the engine is effected by slightly rotating the insulating plate 26 thereby altering the position of the conductive pin 48 with respect to the position of the other moving parts of the engine such as the piston, valves, crankshaft, camshaft, etc. An arm (not shown) may be connected to the plate 26 and extend outwardly to a position readily accessible to the operator. Bolts 27 are sufficiently tight to maintain the plate 26 in a selected position, yet permitting movement to adjust the timing.

Upon the flywheel 20 rotating another 180° around the eccentric bushing 32 the pressure exerted on the crystal element by lever 36 is relieved, but this is after the high voltage potential has been discharged through the spark plug. Relieving the pressure on the crystal element after the squeeze potential has been discharged generates another high voltage electrical potential of a polarity opposite the polarity of the squeeze potential. For certain engines, such as a two-stroke cycle engine, which fire only once during each revolution of the flywheel, it is essential to bleed this second potential to ground without going through the spark plug, or it can be discharged through the spark plug at a time when no ignitable gases are present in the cylinder. Preferably this spark is grounded about 180 degrees from the conductive pin 48 by means of the electrically grounded contact 49. When the crystal element lead 47 approaches the grounded contact 49 the second or undesired spark jumps to it thereby discharging the crystal element and rendering it operative to establish another spark potential during the next 180 degrees of rotation. If the squeeze potential is utilized the release potential is grounded; however, it is also feasible to use the release potential and to ground the squeeze potential.

The piezoelectric unit 21, as shown in FIGURE 3, is bolted to the inside surface of the flywheel 20 by means of bolts 51, and it is obvious that the flywheel should be balanced. The hot lead 47 from the crystal element 46 within the unit 21 extends through a rubber insulator 52, and an enlarged insulator disc 53 may be provided at the base of the insulator 52 to prevent the hot spark from prematurely flashing to ground through the metal case 54 which is around the crystal element 46. The crystal element 46 may generate around 20,000 volts upon being severely squeezed. It is a great advantage to have this high voltage and to apply it almost instantaneously to the plug at the proper time. However, 20,000 volts is not easy to contain over a period of time. Consequently the position of the rise portion of the eccentric sleeve 32 should be so related with respect to the position of the discharge wire 48 that the potential is not held across the crystal unit 46 any longer than is necessary. In determining the proper relationship the timing adjustment should be taken into consideration. Timewise, the maximum squeeze of the crystal element 46 should be immediately ahead of the earliest instant at which the plug is to be fired. The location of the bleed-off contact 49 is not critical, however the release spark should be discharged sufficiently early in the cycle of revolution that the crystal element can thereafter be squeezed over a short period of time to produce its desired spark potential.

Between the metal housing 54 and the crystal element 46 is a thick layer of rubber or other insulating material 60 which insulates the element 46 and which mounts it within the metal housing 54. The insulator 60 must have good insulating qualities, its inside surface adjacent the crystal element 46 must be clean and free of any conductive materials, and the outside surface of the crystal element 46 must also be clean and free of conductive material. Otherwise the high electrical potential generated in the unit will discharge internally either by a spark or by gradually bleeding off.

By applying a squeezing action to the crystal element 46 rather than an impact action, more energy can be obtained from the resulting spark. When a piezoelectric element is hit with a hammer positive and negative spark potentials are almost instantaneously generated, and these can tend to neutralize each other. However, when the element is squeezed severely over a finite (though short) period of time the full potential due to the linear piezoelectric effect is obtained, and in addition thereto there is a reversible ferroelectric domain-switching process which takes place within the atomic structure of the piezoelectric material. This may add 50 to 100% to the energy content of the spark over the energy content obtained by a hammer blow. Since this domain-switching process is reversible the same energy increase is obtained in the release spark.

Figure 6:
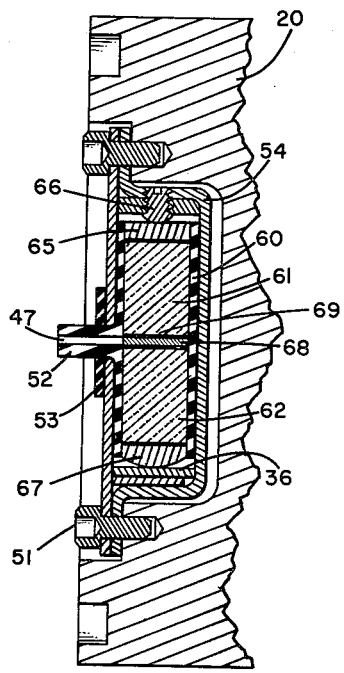
FIGURE 6 is a detail sectional view through FIGURE 3 on the plane of the line 6—6, showing details of the piezoelectric unit.

As best shown by FIGURES 6 and 14, the crystal element 46 preferably is comprised of two separate cylindrical elements 61, 62, electroded on their end faces, and mounted end-to-end within the rubber insulator 60. At the outer end of crystal element 61 there is a thin metal plate 63 whose major faces are covered with a very thin layer of electrically conductive rubber 64, and adjacent the rubber covered metal plate 63 there is a heavy metal end plate 65. The conductive rubber 64, the metal plate 63 and the end plate 65 establish the electrical ground connection for the crystal element 61, and in addition distribute the compressional forces at the end of the crystal element. A set screw 66 extends through the housing 54 into engagement with the metal end plate 65 completing the ground connection. At the outer end of the crystal element 62 there is a rounded metal end plate 67 adjacent to which is the end of the force transmitting lever 36. Between the outer end of the crystal element 62 and the rounded metal plate 67 there is another thin metal plate 63 covered with conductive rubber 64; also between the two crystal elements there is a third thin, rubber covered metal plate 68 which equally distributes the pressure on the abutting end surfaces of the elements 61, 62. The metal plate 68 is covered on both faces with a thin layer of electrically conductive elastomer 69 to help distribute pressures and to serve as the hot connector to the crystal elements 61, 62. The inner end of the hot lead 47 is positioned close to the metal plate 68, and from the metal plate 68 the hot lead 47 extends to a point outside the housing 54. Lead 47 need not be soldered to plate 68 since the electric potential is sufficiently high to cause a spark to jump from plate 68 to the lead 47. The set screw 66 is turned to preload the crystal elements with, for example, about 200 pounds per square inch. Thus wear of parts over a period of time does not materially reduce the voltage output from the crystal elements. The elastomer which covers the three pressure distributing plates 63, 63, 68 should be thick enough to provide good alignability and conformability of parts, but thin enough to prevent extrusion under the forces involved. It has been found that conductive rubber on the order of .002" to .005" thick is suitable.

Preferably the crystal elements 61, 62 are cylindrical pieces of polycrystalline ceramic material such as barium titanate, lead titanate zirconate or the like, suitably polarized and electroded so that upon squeezing, the ends of the two elements adjacent the hot lead 47 are at a high potential while their opposite ends are grounded to the case 54. Thus the high potential portion is in the center of the housing 54 where the rubber enclosing member 60 adequately protects it from moisture and humidity.

The two piezoelectric elements shown, 61, 62, are mechanically in series and electrically in parallel, and the elements used successfully have been about ½" in diameter and about ¾" long. Such elements, when squeezed, generate a high voltage and have sufficient storage capacity to hold the charge for the required short instant of time prior to discharge.

While two piezoelectric elements are shown in the preferred embodiment, it is understood that one element can be made to work, and that more than two elements may be used.

FIGURE 3 clearly illustrates how the rotation of the piezoelectric unit 21 around the eccentric collar 32 causes motion of the end 35 of the lever arm 36.

FIGURE 15 illustrates how the motion of the lever arm 36 causes a compressional force to be applied to the crystals 62, 61. The strong metal housing 54 includes two ends 55, 56. The set screw 66 extends through end 56 into engagement with the metal plate 65. A base member 57 having two upstanding side walls 58 is secured to the housing 54 by rivets, bolts or by welding, with the rubber insulator 60 and the piezoelectric elements positioned between the base and the sidewalls. The front wall 55 of the housing carries a positioning pin 59 extending inwardly toward the piezoelectric crystal 62. The upper end of the lever arm 36 has an integral ridge 37, and it has a hole 43 through it. The positioning pin 37 extends through hole 43 in order to accurately locate the position of the lever 36 between the end wall 55 and the rounded metal end plate 67. The ridge 37 is against the inner face of the wall 55 and the other face of the lever 36 is held tightly at point 70 against the rounded end of the metal end plate 67. The lever 36 moves about 3° due to the eccentric bushing 32 and as it moves it rocks about the ridge 37. Thus the ridge 37 is the fulcrum for the lever 36. The fulcrum 37 is below the contact point 70 and the fulcrum ratio is such that about a 15 or 20 to one force ration is obtained.

In the previously described unit the piezoelectric unit rotated with the flywheel. This construction is not essential and may not always be desirable.

Figure 7:
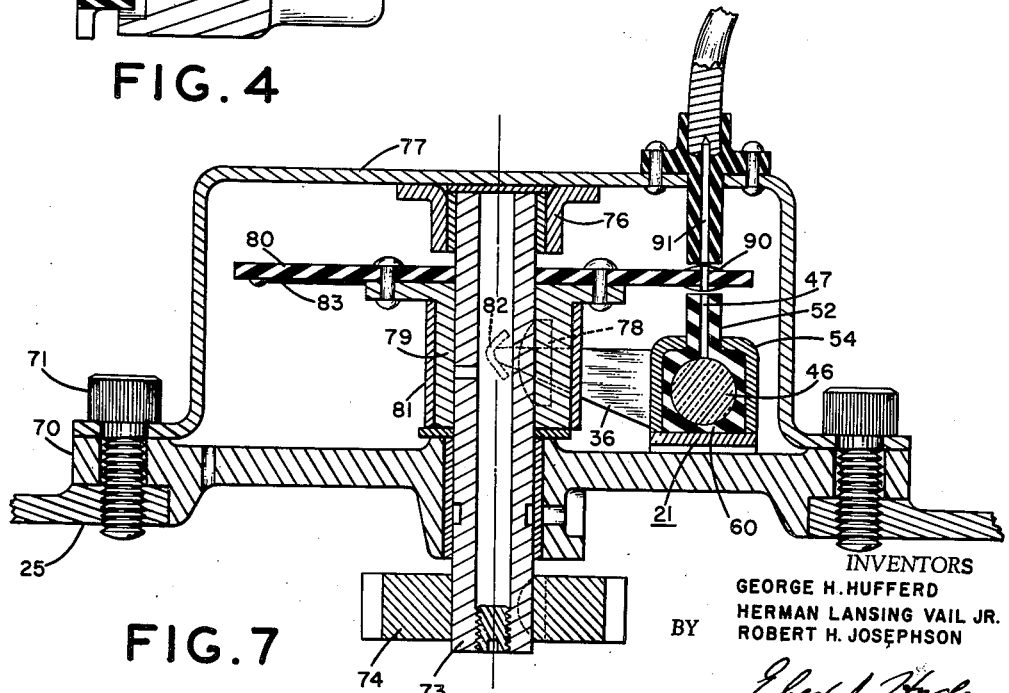
FIGURE 7 is a detail sectional view showing a modified type of distributor unit.

In the device shown in FIGURE 7 the piezoelectric unit 21 is independent of the flywheel, being mounted on stationary plate 70 which is connected to the crankcase 25. A rotatable shaft 73 is driven by gear 74 in timed relation to the crankshaft, and the end of the shaft is journaled at 76 in the housing 77 which is connected to the mounting plate 70 by the bolts 71. Housing 77 may be sealed to the mounting plate 70 to protect the entire electrical system from dirt and moisture. Around the rotatable shaft 73 and keyed to it by key 78 is an eccentric bushing 79 which has an insulating plate 80 connected to it by means of rivets. Around the rotatable eccentric bushing 79 is a stationary metal sleeve 81 having secured to it a V-shaped retainer 82 for the end of lever 36 which stresses the piezoelectric elements. The piezoelectric unit and the lever arm 36 are stationary and by means of the retainer 82 keep the metal sleeve 81 from rotating with the eccentric bushing 79. The internal construction of the piezoelectric unit 21 is similar to that shown in FIGURES 1–6. Thus, as the eccentric bushing 79 rotates relative to the stationary lever arm 36, the arm is actuated as described in connection with FIGURE 15, thereby stressing the crystal element and generating two spark potentials during each revolution, as has previously been described. Simultaneously with the rotation of the eccentric bushing 79 the insulating plate 80 rotates carrying with it a conductive rivet 90 which extends through the plate 80. When the rivet 90 is positioned between the hot lead 47 and the wire 91 which extends to the spark plugs, a spark will jump, thereby substantially instantaneously discharging the potential through the spark plug. The timing of the engine may be varied by making the position of the piezoelectric unit variable with respect to the bushing 79. Thus, while the engine is operating, the housing 77 with its piezoelectric unit may be turned to advance or retard the instant of the spark discharge. For timing adjustment it may be advisable to have the conductor 90 extend a few degrees around the disc 80. The release potential is grounded by wire 83 mounted on the disc 80 about 180 degrees around from the conductive rivet 90, the wire 83 being connected directly to the metal bushing 79 for grounding the release charge when the wire obtains a position adjacent the hot lead wire 47.

The previously described embodiments both refer to an engine wherein only one spark plug discharge is desired per revolution.

It is obvious that if two spark plug discharges are desired the release spark, being separated from the compression spark by 180 degrees of rotation, may be used by merely connecting it to the same spark plug or to a separate plug. Thus two cylinder engines may be operated by using a simple eccentric which stresses and releases a single piezoelectric unit once during each revolution of the engine.

An eccentric sleeve has been shown and described, but it will be realized, since an eccentric is merely a special form of a single lobe cam, that a single lobe cam will perform the same function. Also, multi-lobe cams or compound eccentrics (an ellipse) may be used for multi-cylinder engines.

FIGURES 8, 9 and 10 show plan and sectional views of an insulating timing disc or plate 126 for use in two cylinder engines, such for example as two-cycle and four-cycle alternate firing engines. A piezoelectric unit 21, similar to that previously described, is stationarily mounted with respect to the rotating plate as has previously been described. The insulating plate 126 carries two electrical conductors 127 and 128 which lead to two spark plugs 129, 130 in the engine. Each of the conductors may comprise a length of wire embedded in the plate 126, and as illustrated by the sectional views 9 and 10 each conductor has two heads or contacts which extend out of the insulating material. Conductor 128 preferably has both of its heads 131, 132 on one face of the plate 126, and conductor 127 has its heads 133, 134 on opposite faces of the plate 126.

As the disc 126 rotates past the hot lead 47 of the piezoelectric unit 21 in the direction shown by the arrow 135 the head 133 of conductor 127 is positioned adjacent the hot lead 47 of the piezoelectric unit 21 at a time when the unit has been squeezed to produce a spark potential, as shown by the position of cam 32 against lever arm 36. This potential is discharged through conductor 127 out of contact 134 which at that instant is adjacent a stationary contact 140 leading to the first spark plug 130. When the disc 126 rotates through an angle of 180 degrees, contact 131 of conductor 128 is adjacent the lead 47 which has again become charged due to the release of lever 36 by the eccentric 32 rotating 180 degrees. The spark due to the release potential jumps from the hot lead 47 to contact 131, and the current flows through conductor 128 to contact 132 which is adjacent stationary contact 141 leading to spark plug 129. This plug 130 is fired when the piezoelectric unit is compressed, and the plug 129 is fired 180 degrees later by the release potential.

FIGURE 11 schematically illustrates the operation of a simple eccentric 150 acting on a piezoelectric unit 151 whose high voltage output is connected to a distributor mechanism 152. Both the eccentric 150 and the distributor 152 are driven in proper timed relationship by the motor device 157. A hot contact 153 on the distributor mechanism comes close to contact 154 once during each revolution of the distributor rotor thereby establishing a spark discharge of the potential across the spark plug 155. When the distributor rotates about 180 degrees from the contact 154 the second spark is discharged to ground through contact 156. Either the compression potential or the release potential from the piezoelectric element 151 may be used to fire the plug 155, the other potential being directed to ground.

In FIGURE 12 there is shown a mechanism generally similar to that shown in FIGURE 11, but there are two spark plugs 158, 159 which are fired by the two potentials from the element 151, and there is no need to ground one of the potentials.

FIGURE 13 illustrates schematically the operation of a four cylinder engine. A compound eccentric, in effect a two lobe cam, 160 compresses and releases the piezoelectric element 151 twice in each revolution of the eccentric, thus establishing four electric potentials. The high voltage potentials are connected to the distributor 152, and at each 90 degrees of rotation of the distributor mechanism a potential is discharged through one of the four spark plugs.

FIGURE 16 illustrates an embodiment which is suitable for an eight cylinder engine. The piezoelectric crystal unit 21 is similar to that previously described, and the mechanism for stressing the crystal elements is in principle the same as previously described, but there are two of them, one at each end of the housing 54. Thus there are two rounded metal end plates 67, one at each end of the unit, and there are two lever arms 36, one at each end of the unit. The two lever arms 36 are in engagement with an eccentric 80 mounted on the crankshaft 81. Thus, as the crankshaft rotates twice during each cycle of an eight cylinder engine, there will be eight spark potentials produced, four of them squeeze potentials, and four of them release potentials. These eight potentials are discharged in properly timed relationship through the eight spark plugs of the engine.

The preferred embodiment of the invention, as heretofore shown and described, includes storage of the high potential and a timer or distributor device to connect the stored high potential to the electrodes of a spark plug at the proper instant. However, it is also within the scope of the invention to provide a piezoelectric unit which is squeezed and released in properly timed relation to the movements of the engine parts, thereby to generate spark potentials at the proper instant, and to have the piezoelectric unit always connected to a spark plug.

Thus, there is shown in FIGURES 17 and 18 a shaft 90 which rotates in timed relation to the operation of an engine. Preferably this represents the camshaft which operates at one half the crankshaft speed. Around the shaft 90 are first and second sleeve bearings 91, 92, and an eccentric 93 is mounted around the shaft 90 with a third sleeve bearing 94 positioned therebetween. A housing 95 is mounted around and the sleeve bearings and around the shaft 90, and includes a cylindrical portion 96 which extends at 90 degrees away from the shaft 90. A crystal element 100 is mounted within the housing portion 96, with the electrical insulation 101 therebetween, and an insulated electrical lead 102 extends from outside the housing 96 through the insulation 101 into contact with the hot end of the piezoelectric unit 100. A threaded plug 103 closes the end of the housing 96. At the other end of the piezoelectric element 100 there is a force transmitting member 105 which is in engagement with a ring member 106 around the sleeve bearing 94. As shaft 90 and the eccentric 93 rotate the ring member 106 applies force to the free transmitting member 105 and alternately compresses and releases the crystal element 100. When sufficient electrical potential is built up across the crystal element the potential is discharged as a spark across the electrodes of the spark plug 107.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

We claim:

1. In an internal combustion engine of the reciprocating type wherein the reciprocation of a piston turns a crankshaft, the engine having a spark plug, means for firing the plug comprising: a stationary piezoelectric element; mechanical pressure applying means operating in timed relation with the rotation of the engine crankshaft and connected with the piezoelectric element to periodically apply a controlled squeeze to the element and to then release the said element of the compression caused by the squeezing action, thereby to generate electrical potential in the element; and circuit means including electric charge storing means connecting the piezoelectric element and the electrodes of the spark plug is series circuit so that a voltage generated in the element discharges through the spark plug to fire the same.

2. In an internal combustion engine the structure set forth in claim 1, further characterized by the fact that said mechanical pressure applying means comprises a rigid support for the piezoelectric element fixed with respect to the stationary parts of the engine, a movable pressure applying member opposing said fixed support and with the piezoelectric element being interposed between it and said support, a part rotating in timed relation with the crankshaft of the engine, and motion translating means interposed between said part and the movable pressure applying member, to translate rotation of said part into linear movement of the movable pressure applying member toward said support.

3. In an internal combustion engine of the reciprocating piston type and having spark plug means, a stationary piezoelectric element, means driven from the engine in timed relation with the reciprocation of its piston means periodically to apply a controlled squeezing action and controlled releasing action to said piezoelectric element to cause said element periodically to generate and maintain electric potentials, and distributor means operating in timed relation with said engine periodically to momentarily connect said piezoelectric element and said spark plug means in series circuit only during the maintenance of one of said actions to discharge said electric potential as a spark across the electrodes of said spark plug means.

4. In an internal combustion engine of the type having reciprocating piston means and having spark plug means, means for firing the spark plug means comprising: a polycrystalline piezoelectric element; means driven from the engine in timed relation with the reciprocation of said piston means periodically to squeeze and release said piezoelectric element to generate two electric potentials of opposite polarity, one during said squeezing action and the other during said releasing action; and circuit means including timer means operating in timed relation with the reciprocation of the piston means to electrically connect said polycrystalline piezoelectric element and said spark plug means in series circuit to cause only one of said two electric potentials to be discharged as a spark through a given spark plug means.

5. An internal combustion engine as set forth in claim 4, wherein said spark plug means comprises only one spark plug, further characterized by means for bleeding to ground the other of said two electric potentials.

6. An internal combustion engine as set forth in claim 4, wherein said spark plug means comprises two spark plugs, further characterized by said circuit means discharging only one of said two electric potentials through one of said spark plugs and discharging the other of said electric potentials through the other of said spark plugs.

7. In an internal combustion engine of the type having two reciprocating piston means wherein the reciprocation of the two piston means turns a crankshaft, said engine having two spark plugs, means for firing said two spark plugs comprising: a polycrystalline piezoelectric element, means driven from the engine in timed relation with the reciprocation of the piston means for applying a cyclic variation of stress to said piezoelectric element to generate two electric potentials during each cycle; circuit means including commutator means connected to said piezoelectric element and to said two spark plugs for discharging one electric potential through one spark plug and the other electric potential through the other spark plug.

8. An internal combustion engine as set forth in claim 7, further characterized by said commutator means comprising a conductor mounted for rotation in synchronism with the rotation of said crank-shaft to alternately connect said piezoelectric element with said two spark plugs.

9. An internal combustion engine as set forth in claim 7, further characterized by said commutator means comprising an insulator constrained to rotate in synchronism with the recprocation of said piston means and having a bridging, electrical conductor therein whereby a high dielectric condition is maintained between said piezoelectric element and said spark plugs until said conductor rotates into its bridging position.

10. In an internal combustion engine of the reciprocating type wherein the reciprocation of piston means therein turns a crankshaft, said engine having spark plug means, means for firing the spark plug means comprising: a polycrystalline piezoelectric element normally disconnected electrically from said spark plug means; means driven from the engine in timed relation with the reciprocation of the piston means for applying a cyclic squeeze and release variation of stress to said piezoelectric element to generate two electric potentials during each cycle; and circuit means connected to one side of said piezoelectric element and including commutator switch means periodically connecting said piezoelectric element and said spark plug means in series circuit to discharge one of said electric potentials in timed relation to the reciprocation of said piston means and before the second electric potential is generated, one of said discharges being through a given spark plug and means for discharging the other potential elsewhere.

11. An internal combustion engine of the reciprocating type as set forth in claim 10, further characterized by said engine having only one spark plug and by said circuit means including a connection to ground, and commutator means operating in timed relation to the reciprocation of said piston means for connecting alternate electric potentials directly to ground and through said spark plug.

12. An internal combustion engine of the reciprocating type as set forth in claim 11, further characterized by said commutator switch means comprising an insulator having through it a conductive area whereby a high dielectric condition is maintained between said piezoelectric element and said circuit means until said conductive area rotates into position therebetween.

13. In an internal combustion engine of the reciprocating type wherein the reciprocation of piston means within a cylinder block turns a crankshaft, said engine having spark plug means and a flywheel mounted on a rotatable shaft, means for firing the spark plug means comprising: a polycrystalline piezoelectric element mounted on said flywheel for rotation with said flywheel, cam means encircling said rotatable shaft and mounted on said housing whereby said flywheel and shaft rotate with respect to said cam means; force transmitting means actuated by said cam means for applying force to said piezoelectric element as said flywheel rotates around said cam means to cause the generation of at least two electric potentials during each revolution of said flywheel; and circuit means including commutator switch means operating in timed relation to the reciprocation of said piston means connecting said piezoelectric element and said spark plug means in series circuit to cause only one of said two electric potentials to be discharged through a given spark plug means.

14. An internal combustion engine as set forth in claim 13, wherein there are two pistons and two spark plugs and wherein said commutator switch means discharges one of said electric potentials through one of said spark plugs and the other electric potential through the other spark plug.

15. In an internal combustion engine of the reciprocating type wherein the reciprocation of piston means turns a crankshaft, said engine having spark plug means, means for firing said spark plug means comprising: piezoelectric means for generating a high voltage electrical potential in timed relation to the movement of said piston means, storage means normally electrically disconnected from said spark plug for storing said generated high voltage electrical potential, means for electrically connecting said storage means with said spark plug means only when said piston means reaches said predetermined position to discharge at that instant said stored high voltage electrical potential through said spark plug means, and circuit means for dissipating any secondary potential.

16. In an internal combustion engine of the reciprocating type wherein the reciprocation of piston means turns a crankshaft, said engine having spark plug means, means for firing said spark plug means comprising: piezoelectric means for periodically generating a high voltage electrical potential in timed relation to the cyclic movements of said piston means, storage means for periodically storing said generated high voltage electrical potential, and cyclic means for electrically connecting said storage means periodically to said spark plug means when said piston means moves to a predetermined position relative to said crankshaft to periodically discharge said high voltage electrical potential through said spark plug means, and circuit means for discharging to ground other than through said spark plug any secondary potential.

17. In an ignition system for an internal combustion engine of the type wherein a reciprocating piston turns a crankshaft, said engine having only one spark plug; means for firing said spark plug comprising: a piezoelectric crystal element, means driven from said engine for squeezing and releasing said crystal element once during each revolution of said crankshaft whereby to generate two separate high voltage electrical potentials one of which is positive and the other of which is negative, and circuit means including commutator means driven in timed relationship with the rotation of said crankshaft for alternately connecting said crystal element with said spark plug and for short circuiting the crystal element to thereby discharge only one of said two potentials through said spark plug.

18. In an internal combustion engine of the reciprocating type wherein the reciprocation of a piston turns a crankshaft, the engine having a spark plug, means for firing the spark plug comprising; a piezoelectric element; mechanical pressure-applying means operating in timed relation with the engine crankshaft and connected with the piezoelectric element to periodically apply a controlled force to the element, with said force varying from a minimum value to a maximum value over a period of time sufficiently long to assure that the piezoelectric element will be free of shock excitation, said force variation generating an electric potential in said piezoelectric element; and circuit means including switch means operating in timed relation with piston reciprocation, connected to said piezoelectric element and to said spark plug to discharge said potential through the spark plug.

19. In an internal combustion engine of the reciprocating type as set forth in claim 18, further characterized by said force following generally a sine-like curve thereby to generate an electric potential in said element.

20. In an internal combustion engine of the reciprocating type wherein the reciprocation of a piston turns a crankshaft, the engine having a spark plug, means for firing the spark plug comprising; a piezoelectric element, means for applying a static load to the piezoelectric element in approximately timed relation with the rotation of said crankshaft to generate an electric potential in the element; and circuit means including a timer switch operating in timed relation to the reciprocation of the piston for connecting said piezoelectric element to said spark plug in timed relation to the rotation of said crankshaft.

21. In an internal combustion engine of the reciprocating type wherein the reciprocation of a piston turns a crankshaft, the engine having a spark plug, means for firing the spark plug comprising; a piezoelectric element having a hot side and an effectively electrically grounded side; mechanical pressure-applying means operating in timed relation with the engine crankshaft and connected with the piezoelectric element to periodically apply a controlled force to the element, said force being applied gradually from a minimum value to a maximum value over a period of time such that the piezoelectric element is free of shock excitation sufficient to cause it to vibrate longitudinally at its natural frequency, thereby to generate an electric potential in said piezoelectric element; a normally open electric circuit from the hot side of said piezoelectric element to ground, a normally open electric circuit from the hot side of said piezoelectric element to said spark plug, and distributor means operating in timed relation with the rotation of said crankshaft to alternately intermittently close said two circuits.

22. An ignition device for energizing an ignition means comprising: a piezoelectric element; mechanical pressure-applying means connected with the piezoelectric element periodically to apply a controlled force to the element, said force varying from a higher value to a maximum value and back to said minimum value over a cyclic period of time such that the piezoelectric element is free of shock excitation sufficient to cause it to vibrate at its natural frequency, thereby to generate an electrical potential in said piezoelectric element and to hold said potential across said piezoelectric element while substantially said higher value force is applied to said element; and switch means for discharging the charge from said piezoelectric element through the ignition means during the said period of time that substantially said higher pressure-applying force is applied to said piezoelectric element, and means for operating said switch to cause said discharge to be in timed relation to a predetermined point in said cyclic period of time.

23. An ignition device for firing the spark plug of an engine of the internal combustion type wherein the reciprocation of a piston turns a crankshaft comprising: a piezoelectric element; mechanical pressure applying means connected with the piezoelectric element and adapted to be operated in timed relation to the rotation of the engine crankshaft to periodically apply a controlled squeeze to said element, thereby to generate and hold an electrical potential in said element, and to then release said element of the compression caused by the squeezing action thereby to generate a second electrical potential, and circuit means adapted to connect said piezoelectric element to said spark plug to cause at least one of said potentials to be discharged through said spark plug to fire the same in timed relation to the reciprocation of the piston and adapted also to discharge the other potential.

24. An ignition device for energizing an ignition means comprising: a piezoelectric element; mechanical pressure applying means connected with said piezoelectric element and adapted periodically to apply a controlled force to said element which varies from a minimum value to a higher value and then returns to said minimum value over a cyclic period of time such that the piezoelectric element is free of shock excitation which is sufficient to cause it to vibrate at its natural frequency and thereby to generate an electrical potential in said piezoelectric element and to hold said potential across said piezoelectric element while said higher force is applied to said element; and distributor means adapted to discharge the charge from said piezoelectric element through said ignition means during the period of time that said higher force is applied to said piezoelectric element and in timed relation to a predetermined point in said cyclic period of time.

References Cited in the file of this patent

UNITED STATES PATENTS

| 2,717,589 | Harkness | Sept. 13, 1955 |
| 2,917,670 | Crownover | Dec. 15, 1959 |
| 2,954,506 | Harkness | Sept. 27, 1960 |
| 2,959,159 | McCory | Nov. 8, 1960 |

FOREIGN PATENTS

| 712,803 | Great Britain | July 28, 1954 |

UNITED STATES PATENT OFFICE
CERTIFICATION OF CORRECTION

Patent No. 3,009,975                            November 21, 1961

George H. Hufferd et al.

It is hereby certified that error appears in the above numbered patent requiring correction and that the said Letters Patent should read as corrected below.

Column 14, lines 8 and 9, for "higher value to a maximum value" read -- minimum value to a higher value --.

Signed and sealed this 17th day of April 1962.

(SEAL)
Attest:

ESTON G. JOHNSON
Attesting Officer

DAVID L. LADD
Commissioner of Patents